United States Patent
Singh et al.

(10) Patent No.: US 9,869,255 B2
(45) Date of Patent: Jan. 16, 2018

(54) FEEDBACK CONTROLLED SYSTEM FOR CHARGED IGNITION PROMOTER DROPLET DISTRIBUTION

(71) Applicant: Caterpillar Inc., Peoria, IL (US)

(72) Inventors: Jaswinder Singh, Dunlap, IL (US); Martin L. Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 14/960,680

(22) Filed: Dec. 7, 2015

(65) Prior Publication Data

US 2017/0159583 A1    Jun. 8, 2017

(51) Int. Cl.
| | |
|---|---|
| *F02D 19/12* | (2006.01) |
| *F02M 25/00* | (2006.01) |
| *F02M 21/02* | (2006.01) |
| *F02D 19/06* | (2006.01) |
| *F02D 41/00* | (2006.01) |
| *F02D 41/14* | (2006.01) |

(52) U.S. Cl.
CPC ......... *F02D 19/12* (2013.01); *F02D 19/0647* (2013.01); *F02D 41/0027* (2013.01); *F02D 41/1454* (2013.01); *F02M 21/0215* (2013.01); *F02M 25/00* (2013.01); *F02D 2200/101* (2013.01)

(58) Field of Classification Search
CPC ........... F02M 2027/047; F02M 27/042; F02M 27/045; F02M 27/04; F23D 11/32; B05B 5/0533; F23C 99/001; Y02T 10/36; Y02T 10/121; F02D 41/0025; F02D 19/081; F02D 19/0692; F02D 19/084; F02D 19/0655; F02D 19/0694; F02D 19/08; F02D 19/087; F02D 19/0613; F02D 19/0615; F02D 19/0649; F02D 19/0652; F02D 19/12

USPC ................ 123/575, 576, 577, 578
See application file for complete search history.

(56) References Cited

U.S. PATENT DOCUMENTS

| | | |
|---|---|---|
| 4,082,070 A | 4/1978 | Säufferer et al. |
| 4,150,647 A | 4/1979 | Suzuki et al. |
| 4,439,980 A | 4/1984 | Biblarz et al. |
| 5,234,170 A | 8/1993 | Schirmer et al. |
| 6,006,720 A | 12/1999 | Yanagihara et al. |

(Continued)

OTHER PUBLICATIONS

U.S. Application of Jaswinder Singh et al. titled "Feedback Controlled System for Ignition Promoter Droplet Generation,", filed Dec. 7, 2015.

*Primary Examiner* — Sizo Vilakazi
(74) *Attorney, Agent, or Firm* — Finnegan, Henderson, Farabow, Garrett & Dunner, LLP (57) ABSTRACT

An engine system is disclosed. The engine system may have an engine including at least one cylinder. The engine system may also have a first source configured to supply fuel for combustion in the engine and a second source configured to supply an ignition promoter material for combustion in the engine. The engine system may have a droplet injector configured to generate at least one droplet of the ignition promoter material, apply an amount of charge on the at least one droplet, and deliver the at least one droplet to the at least one cylinder. The engine system may also have a controller. The controller may be configured to determine an engine parameter, and to determine the amount of charge based on the engine parameter. In addition, the controller may be configured to adjust the droplet injector to apply the determined amount of charge to the at least one droplet.

13 Claims, 5 Drawing Sheets

(56) References Cited

U.S. PATENT DOCUMENTS

| | | |
|---|---|---|
| 6,598,584 B2 | 7/2003 | Beck et al. |
| 6,945,198 B2 | 9/2005 | Abrams et al. |
| 7,926,467 B2 | 4/2011 | Theodorof |
| 8,783,229 B2 | 7/2014 | Kim et al. |
| 2013/0152899 A1 | 6/2013 | Choi et al. |
| 2014/0032081 A1 | 1/2014 | Willi et al. |
| 2014/0090621 A1 | 4/2014 | Hernandez et al. |
| 2014/0360460 A1 | 12/2014 | Peters et al. |
| 2015/0167577 A1 | 6/2015 | Zukouski |

FEEDBACK CONTROLLED SYSTEM FOR CHARGED IGNITION PROMOTER DROPLET DISTRIBUTION

TECHNICAL FIELD

The present disclosure relates generally to a feedback controlled system, and, more particularly, to a feedback controlled system for charged ignition promoter droplet distribution.

BACKGROUND

Internal combustion engines generate exhaust as a by-product of fuel combustion within the engines. Engine exhaust contains, among other things, unburnt fuel, particulate matter such as soot, and gases such as carbon monoxide and $NO_x$. To comply with regulatory emissions control requirements, it is desirable to reduce the amount of unburnt fuel, soot, and other gases in the engine exhaust. Due to the rising cost of liquid fuel (e.g. diesel fuel) and to comply with the emissions control requirements, engine manufacturers have developed dual-fuel engines and/or gaseous-fuel engines.

In these engines, using a lower-cost fuel, for example, a gaseous fuel together with or without liquid fuel helps improve the cost efficiency of the engine. Use of gaseous fuel to fully or partially replace the traditional liquid fuels such as, gasoline or diesel fuel, may also help to lower the amount of soot and/or other undesirable gases in the exhaust. To comply with increasingly stringent emissions control regulations, these engines may be operated with a lean air-fuel ratio, which may prevent the fuel from being fully burned within the combustion chamber.

Incomplete combustion of the fuel may result in the formation of undesirable amounts of $NO_x$. Further, any fuel that remains unburnt and escapes from the combustion chambers does not participate in combustion, reducing the thermal efficiency of the engine. The escaping unburnt fuel also contributes to the total amount of undesirable emissions produced by the engine. Although the unburnt fuel and $NO_x$ may be removed from the exhaust in one or more after-treatment devices, implementing these devices adds to the cost of operating the engine. Therefore, it is desirable to reduce the amount of unburnt fuel and $NO_x$ in the exhaust leaving the combustion chamber.

One technique for improving combustion of the fuel in the combustion chamber is disclosed in U.S. Patent Application Publication No. 2014/0090621 A1 to Hernandez et al. ("the '621 publication") that published on Apr. 3, 2014. The '621 publication discloses a combustion system that may be employed in an engine. The combustion system of the '621 publication includes a combustion chamber having one or more fuel injectors configured to spray fuel into the combustion chamber. The '621 publication discloses that the combustion chamber may include electrodes that can apply an electric field between the fuel injector and the combustion chamber. The '621 publication explains that fuel droplets exiting the fuel injectors may be charged and may follow a trajectory governed by the electric field established within the combustion chamber. The '621 publication discloses that all the fuel droplets have a substantially similar potential, which may cause them to repel each other and spread towards the combustion chamber head, combustion chamber sidewalls, and combustion chamber bottom.

Although the '621 publication discloses the use of an electric field to improve distribution of fuel droplets in a combustion chamber, the disclosed system may still be less than optimal. In particular, the method of the '621 publication does not control the amount of charge on the fuel droplets injected into the combustion chamber. Because fuel droplets having the same amount of charge may repel each other by a same distance, the distribution of fuel droplets within the combustion chamber may be suboptimal. Furthermore, the system of the '621 publication establishes an electric field between the fuel injectors and the combustion chamber walls. Thus, although the fuel droplets may repel each other, they may be attracted to the combustion chamber walls allowing the fuel droplets to impinge upon and stick to the combustion chamber walls. Fuel on the combustion chamber walls may not be fully burned during the combustion cycle and may be discharged with the exhaust exiting the combustion chamber.

The engine system of the present disclosure solves one or more of the problems set forth above and/or other problems in the art.

SUMMARY

In one aspect, the present disclosure is directed to an engine system. The engine system may include an engine. The engine may include at least one cylinder. The engine system may also include a first source configured to supply fuel for combustion in the engine. The engine system may include a second source configured to supply an ignition promoter material for combustion in the engine. The engine system may also include a droplet injector. The droplet injector may be configured to generate at least one droplet of the ignition promoter material. The droplet injector may also be configured to apply an amount of charge on the at least one droplet. Further, the droplet injector may be configured to deliver the at least one droplet to the at least one cylinder. The engine system may also include a controller. The controller may be configured to determine an engine parameter. The controller may also be configured to determine the amount of charge based on the engine parameter. In addition, the controller may be configured to control the droplet injector to apply the determined amount of charge to the at least one droplet.

In another aspect, the present disclosure is directed to a method of operating an engine. The method may include delivering air for combustion to at least one cylinder of the engine. The method may further include supplying fuel to the at least one cylinder for combustion. The method may also include supplying an ignition promoter material to a droplet injector. In addition, the method may include determining an engine parameter based on signals received from at least one sensor associated with the engine. The method may include generating at least one droplet of an ignition promoter material. The method may also include determining an amount of charge based on the engine parameter. Further, the method may include applying the determined amount of charge to the at least one droplet. The method may also include combusting the at least one droplet and the fuel in the at least one cylinder.

In yet another aspect, the present disclosure is directed to an engine. The engine may include a plurality of cylinders. The engine may also include an intake manifold configured to deliver air for combustion to the cylinders. The engine may further include an exhaust manifold configured to discharge exhaust from the cylinders. The engine may include a first source configured to supply fuel for combustion in the cylinders. The engine may also include a second source configured to supply an ignition promoter material.

Further, the engine may include a droplet generator configured to receive the ignition promoter material from the second source and generate at least one droplet of the ignition promoter material. The engine may also include a charge generator configured to apply an amount of charge to the at least one droplet. In addition, the engine may include a controller. The controller may be configured to determine an engine parameter. The controller may also be configured to determine the amount of charge based on the engine parameter. Further, the controller may be configured to control the charge generator to apply the determined amount of charge on the at least one droplet.

DETAILED DESCRIPTION

Figure 1:
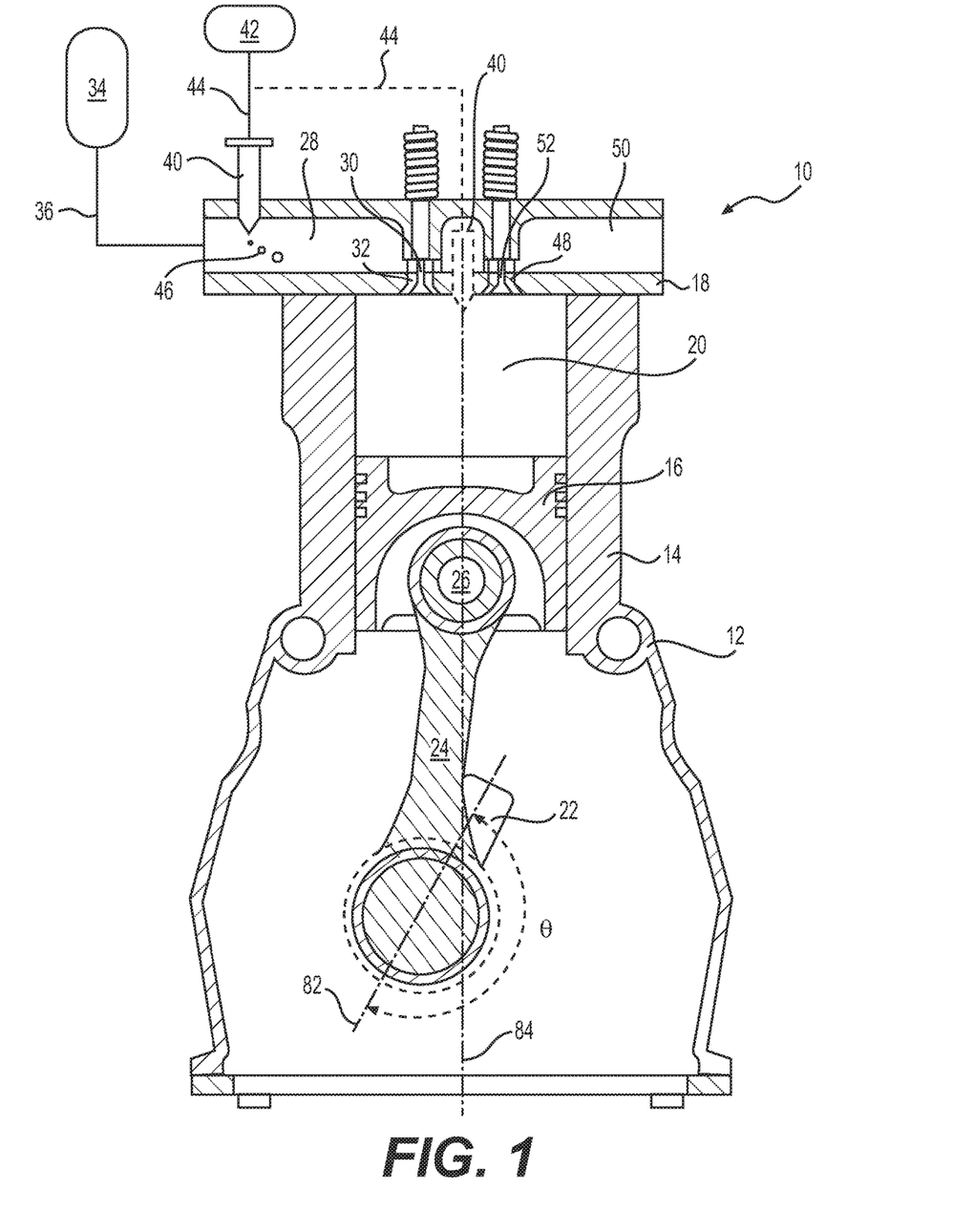
FIG. 1 is a diagrammatic illustration of an exemplary disclosed engine.

FIG. 1 illustrates an exemplary internal combustion engine 10. Engine 10 may be a four-stroke gaseous-fuel powered engine. It is contemplated, however, that engine 10 may be any other type of internal combustion engine such as, for example, a gaseous-fuel powered two-stroke engine, a dual-fuel powered two-stroke or four-stroke engine, or a two-stroke or four-stroke diesel or gasoline engine. It is also contemplated that engine 10 may be a spark-ignition engine or a compression-ignition engine. Engine 10 may include, among other things, an engine block 12 that at least partially defines a cylinder 14. Piston 16 may be slidably disposed within cylinder 14. Cylinder head 18 may be connected to engine block 12 to close off an end of cylinder 14. Piston 16 together with cylinder head 18, may define combustion chamber 20. It is contemplated that engine 10 may include any number of combustion chambers 20. Moreover, combustion chambers 20 in engine 10 may be disposed in an "in-line" configuration, a "V" configuration, an opposing-piston configuration, or in any other suitable configuration.

Piston 16 may be configured to reciprocate between a bottom-dead-center (BDC) or lower-most position within cylinder 14, and a top-dead-center (TDC) or upper-most position. As also shown in FIG. 1, engine 10 may include crankshaft 22 rotatably disposed within engine block 12 at a location opposite to cylinder head 18. Connecting rod 24 may be pivotably connected to piston 16 via pin 26 at one end and to crankshaft 22 at the other end. The reciprocal movement of piston 16 within cylinder 14 from adjacent cylinder head 18 towards crankshaft 22 and vice-versa may be transferred to a rotational movement of crankshaft 22 by connecting rod 24. Similarly, the rotation of crankshaft 22 may be transferred as a reciprocating movement of piston 16 within cylinder 14 by connecting rod 24. As crankshaft 22 rotates through about 180 degrees, piston 16 and connecting rod 24 may move through one full stroke between BDC and TDC.

As the piston moves from the TDC to the BDC position, air may be drawn from intake manifold 28 into combustion chamber 20 via one or more intake valves 30. In particular, as piston 16 moves downward within cylinder 14 away from cylinder head 18, one or more intake valves 30 may open and allow air to flow into combustion chamber 20 from intake manifold 28. When intake valves 30 are open and a pressure of air at intake ports 32 is greater than a pressure within combustion chamber 20, air will enter combustion chamber 20 via intake ports 32. Intake valves 30 may be subsequently closed, for example, during an upward movement of piston 16 from the BDC to the TDC.

As further illustrated in FIG. 1, engine 10 may include first source 34, which may be connected to intake manifold 28 via passageway 36. First source 34 may be a fuel tank configured to supply fuel for combustion to cylinder 14. For example, first source 34 may be associated with one or more pumps (not shown), one or more valves (not shown), and/or other fuel-delivery components well known in the art to supply fuel for combustion to cylinder 14. Although, FIG. 1 illustrates first source 34 supplying fuel to intake manifold 28, it is contemplated that first source 34 and passageway 36 may additionally or alternatively be configured to deliver fuel directly to combustion chamber 20. First source 34 may supply a liquid fuel, for example, diesel, gasoline, etc., or gaseous fuel such as natural gas. It is also contemplated that when supplying gaseous fuel to engine 10, first source 34 may be configured to store the gaseous fuel in liquefied form.

Engine 10 may include droplet injector 40, which may be disposed in intake manifold 28. Droplet injector 40 may be connected to second source 42 via passageway 44. Second source 42 may be a tank configured to store an ignition promoter material that initiates and/or promotes combustion of fuel within combustion chamber 20. Ignition promoter material may include lubrication oil or any other type of liquid that may promote combustion within the combustion chamber. Droplet injector 40 may be configured to draw ignition promoter material from second source 42 and discharge the ignition promoter material into intake manifold 28 in the form of droplets 46. In one exemplary embodiment, droplet injector 40 may be configured to discharge a predetermined number of droplets 46 of ignition promoter material into intake manifold 28. The number of droplets 46 discharged by droplet injector 40 may have a uniform droplet size or non-uniform droplet size. In one exemplary embodiment, a droplet size of droplet 46 may be represented by an average diameter of droplet 46. In another exemplary embodiment, droplet size of droplet 46 may be represented by a volume of ignition promoter material in droplet 46. One of ordinary skill in the art would recognize, however, that an increase or decrease in the average diameter of droplet 46 may result in a corresponding increase or decrease in the volume of ignition promoter material in droplet 46.

Although only one droplet injector 40 disposed in intake manifold 28 is illustrated in FIG. 1, it is contemplated that any number of droplet injectors 40 may be disposed in intake manifold 28. In addition, although FIG. 1 illustrates droplet injector 40 as disposed in intake manifold 28, it is contemplated that one or more droplet injectors 40 may additionally or alternatively be disposed in cylinder head 18 as shown by the dashed lines in FIG. 1. Thus, one or more droplet injectors 40 may deliver droplets 46 of ignition promoter material to one or both of intake manifold 28 and combustion chamber 20. Droplet injectors 40 may deliver droplets 46 before, during, or after entry of intake gases from intake manifold 28 into combustion chamber 20. When droplet injectors 40 deliver droplets 46 of ignition promoter material into intake manifold 28, droplets 46 may travel with the intake gases, including air and fuel, flowing through intake manifold 28 into combustion chamber 20.

As piston 16 moves upward from the BDC to the TDC position from adjacent crankshaft 22 towards cylinder head 18, piston 16 may mix and compress the air, fuel, and droplets 46 of the ignition promoter material present in combustion chamber 20. As the mixture within combustion chamber 20 is compressed, a pressure and a temperature of the mixture will increase. Eventually, the pressure and the temperature of the mixture will reach a point at which droplets 46 of the ignition promoter material may ignite. Combustion of droplets 46 may further increase the pressure and temperature within combustion chamber 20. The increased temperature in combustion chamber 20 may help initiate combustion of the air-fuel-mixture in combustion chamber 20. Combustion of droplets 46 of the ignition promoter material and of the air-fuel-mixture in combustion chamber 20 may cause an increase in pressure in combustion chamber 20, which may cause piston 16 to slidingly move away from cylinder head 18 towards crankshaft 22. Translational movement of piston 16 within cylinder 14 may be transferred by connecting rod 24 into a rotational movement of crankshaft 22. Although compression-ignition of the ignition promoter material and/or the air-fuel-mixture has been described above, it is also contemplated that combustion of droplets 46 of the ignition promoter material and/or the air-fuel-mixture in combustion chamber 20 may be initiated using a spark, glow plug, pilot flame, or by any other method known in the art.

At a particular point during the downward travel of piston 16 from TDC towards BDC, one or more exhaust ports 48 located within cylinder head 18 may open to allow pressurized exhaust within combustion chamber 20 to exit into exhaust manifold 50. In particular, as piston 16 moves downward within cylinder 14, piston 16 may eventually reach a position at which exhaust valves 52 move to fluidly communicate combustion chamber 20 with exhaust ports 48. When combustion chamber 20 is in fluid communication with exhaust ports 48 and a pressure of exhaust in combustion chamber 20 is greater than a pressure within exhaust manifold 50, exhaust will exit combustion chamber 20 through exhaust ports 48 into exhaust manifold 50. In the disclosed embodiment, movement of intake valves 30 and exhaust valves 52 may be cyclical and controlled by way of one or more cams (not shown) mechanically connected to crankshaft 22. It is contemplated, however, that movement of intake valves 30 and exhaust valves 52 may be controlled in any other conventional manner, as desired. In addition, although an operation of a four-stroke engine has been described above with respect to FIG. 1, it is contemplated that engine 10 may instead be a two-stroke engine.

Figure 2:
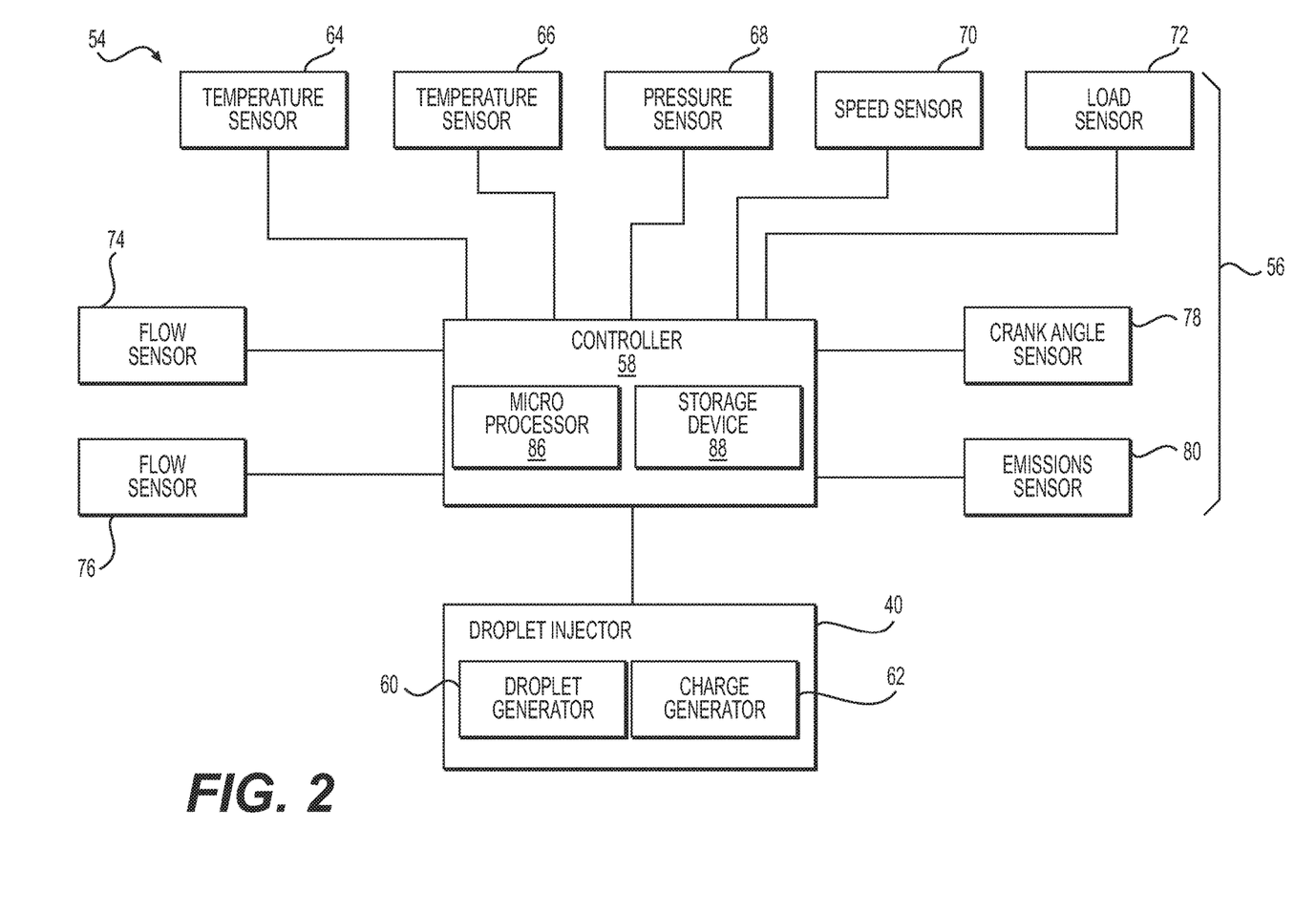
FIG. 2 is a schematic illustration of an exemplary engine system that may be used with the engine of FIG. 1.

FIG. 2 illustrates an exemplary engine system 54 that may be used in conjunction with engine 10. Engine system 54 may include components that cooperate to determine and control an amount of ignition promoter material that may be delivered to combustion chamber 20. As illustrated in FIG. 2, engine system 54 may include droplet injector 40, sensor arrangement 56, and controller 58. Droplet injector 40 may include droplet generator 60 and charge generator 62. Droplet generator 60 may be configured to generate droplets 46 of the ignition promoter material and deliver droplets 46 to intake manifold 28 and/or combustion chamber 20. Droplet generator 60 may be equipped with one or more mechanical devices, for example, nozzles, valves, compressors, pressurized gas supplies, etc. that may cooperate to transform a flow of ignition promoter material received from second source 42 (see FIG. 1) into one or more droplets 46. It is also contemplated that droplet generator may employ electrical or electro-mechanical devices to form droplets 46.

Charge generator 62 may be associated with droplet generator 60 and may be configured to apply a predetermined amount of electrical charge on droplets 46 formed by droplet generator 60. Charge generator 62 may employ, for example, induction charging, diffusion charging, corona charging, electrostatic charging, field charging, or any other charging techniques known in the art for applying an amount of electrical charge to droplet 46. In one exemplary embodiment, charge generator 62 may be configured to apply an electric field between portions of droplet generator 60 and an electrical ground to apply the predetermined amount of charge on droplet 46. The predetermined amount of charge may be measured in terms of coulombs or may be represented indirectly in terms of an electrical potential of droplet 46 relative to an electrical ground.

Sensor arrangement 56 may include temperature sensors 64, 66, pressure sensor 68, speed sensor 70, load sensor 72, flow sensors 74, 76, crank-angle sensor 78, and emissions sensor 80. It is contemplated that sensor arrangement 56 may include fewer or additional sensors. For example, sensor arrangement 56 may include additional temperature and pressure sensors to monitor temperature and pressure of the ignition promoter material, first source 34, second source 42, exhaust manifold 50, etc. It is also contemplated that sensor arrangement 56 may include additional sensors to monitor, for example, lubricant pressure and temperature, exhaust manifold temperature, coolant temperature and pressure, and any other engine parameters known in the art for monitoring the functioning of engine 10.

Temperature sensor 64 may be disposed in intake manifold 28 and may be configured to monitor a temperature of intake gases passing through intake manifold 28. Likewise, temperature sensor 66 may be disposed within combustion chamber 20 and may be configured to monitor a temperature of an air-fuel-mixture within combustion chamber 20. In one exemplary embodiment, temperature sensor 66 may be disposed on a wall of cylinder 14 or in cylinder head 18 and may be configured to monitor a temperature of combustion chamber 20. Temperature sensors 64, 66, may include diode thermometers, thermistors, thermocouples, infrared sensors, or any other types of temperature sensors known in the art.

Pressure sensor 68 may be disposed on a wall of cylinder 14 or in cylinder head 18. Pressure sensor 68 may be configured to monitor a pressure within combustion chamber 20 as piston 16 reciprocates within cylinder 14. Pressure sensor 68 may include piezo resistive strain gages, capacitive elements, piezoelectric type sensors, displacement type sensors, or any other types of pressure sensors known in the art. In one exemplary embodiment, pressure sensor 68 may be configured to determine an indicated mean effective pressure (IMEP) within combustion chamber 20. IMEP may represent an average pressure in combustion chamber 20 as piston 16 travels between TDC and BDC. It is also contemplated that IMEP for engine 10 may be determined based on other engine parameters such as a torque output of engine 10, whether engine 10 is a two-stroke or four-stroke engine, an amount of volumetric displacement of cylinder 14, etc.

Speed sensor 70 may be disposed on or adjacent crankshaft 22 and may be configured to monitor and engine speed associated with engine 10. In one exemplary embodiment engine speed may be a rotational speed of crankshaft 22. Speed sensor 70 may embody a conventional rotational speed detector having a stationary element rigidly connected to engine block 12 (see FIG. 1) that is configured to sense a relative rotational movement of crankshaft 22. The stationary element may be a magnetic or optical element configured to detect the rotation of an indexing element (e.g., a toothed tone wheel, an embedded magnet, a calibration stripe, teeth of a timing gear, a cam lobe, etc.) connected to, embedded within, or otherwise forming a portion of crankshaft 22. Speed sensor 70 may be located adjacent the indexing element and may be configured to generate a signal each time the indexing element (or a portion thereof, for example, a tooth) passes near the stationary element. Rotational speed of crankshaft 22 may be determined based on the signals generated by speed sensor 70. Other types of sensors and/or strategies may also or alternatively be employed to determine an engine speed associated with engine 10.

Load sensor 72 may be any type of sensor known in the art that is capable of generating a load signal indicative of an amount of load exerted on engine 10. Load sensor 72 may, for example, be a torque sensor associated with engine 10, or an accelerometer. When load sensor 72 is embodied as a torque sensor, the load signal may correspond with a change in torque output experienced by engine 10. In one exemplary embodiment, the torque sensor may be physically associated with engine 10. In another exemplary embodiment, the torque sensor may be a virtual sensor used to calculate the torque output of engine 10 based on one or more other sensed parameters (e.g., fueling of the engine, speed of the engine, and/or the drive ratio of the transmission or final drive). When load sensor 72 is embodied as an accelerometer, the accelerometer may embody a conventional acceleration detector rigidly connected to engine block 12 or other components of engine 10 in an orientation that allows sensing of changes in acceleration in the forward and rearward directions for engine 10.

Flow sensor 74 may be disposed in intake manifold 28 and may be configured to determine an air flow rate in intake manifold 28. Likewise, flow sensor 76 may be disposed in passageway 36 and may be configured to determine a fuel flow rate from first source 34 to cylinder 14. Flow sensors 74, 76 may include hot or cold wire sensors, orifice sensors, vane sensors, membrane sensors, pressure difference based sensors, or any other type of flow sensors known in the art.

Crank-angle sensor 78 may be located on engine block 12. Crank-angle sensor 78 may be a Hall Effect sensor, an optical sensor, a magnetic sensor, or any other type of crank-angle sensor known in the art. Crank-angle sensor 78 may be configured to send signals indicative of crank-angle θ (see FIG. 1) between a longitudinal axis 82 (see FIG. 1) of connecting rod 24 and a longitudinal axis 84 (see FIG. 1) of cylinder 14. In one exemplary embodiment, crank-angle sensor 78 may also be configured to send signals indicative of a rotational speed of crankshaft 22.

Emissions sensor 80 may be configured to determine an amount of emissions in the exhaust flowing through exhaust manifold 50. In one exemplary embodiment, emissions sensor 80 may be a physical $NO_x$ emission sensor, which may measure the $NO_x$ emission level in the exhaust in exhaust manifold 50. In another exemplary embodiment, emissions sensor 80 may provide calculated values of $NO_x$ emission level based on other measured or calculated parameters, such as compression ratios, turbocharger efficiency, after-cooler characteristics, temperature values, pressure values, ambient conditions, fuel rates, and engine speeds, etc. It is contemplated that emissions sensor 80 may embody other types of sensors known in the art to determine an amount of soot, amount of $NO_x$ or amounts of other emissions components in the exhaust from engine 10.

Although FIG. 2 illustrates only one each of temperature sensors 64, 66, pressure sensor 68, speed sensor 70, load sensor 72, flow sensors 74, 76, crank-angle sensor 78, and emissions sensor 80, it is contemplated that engine system 54 may have any number of temperature sensors 64, 66, pressure sensors 68, speed sensors 70, load sensors 72, flow sensors 74, 76, crank-angle sensors 78, and emissions sensors 80. It is also contemplated that engine 10 may include other types of sensors, for example, temperature sensors, flow-rate sensors, pressure sensors, oxygen sensors, timing detectors, timers, and/or any other types of sensors known in the art.

Controller 58 may embody a microprocessor 86 for controlling an operation of engine system 54 in response to signals received from sensors in sensor arrangement 56. Although FIG. 2 illustrates one microprocessor 86, it is contemplated that controller 58 may include any number of microprocessors 86, field programmable gate arrays (FPGAs), digital signal processors (DSPs), etc. Numerous commercially available microprocessors 86 can be configured to perform the functions of controller 58. It should be appreciated that controller 58 could readily embody a microprocessor 86 separate from that controlling other engine system functions, or that controller 58 could be integral with a general engine system microprocessor and be capable of controlling numerous engine system functions and modes of operation. If separate from the general engine system microprocessor, controller 58 may communicate with the general engine system microprocessor via data links or other methods. Various other known circuits may be associated with controller 58, including power supply circuitry, signal-conditioning circuitry, actuator driver circuitry (i.e., circuitry powering solenoids, motors, or piezo actuators), communication circuitry, and other appropriate circuitry.

Controller 58 may also include storage device 88. Storage device 88 may be configured to store data or one or more instructions and/or software programs that perform functions or operations when executed by the one or more microprocessors 86. Data stored in storage device 88 may include, for example, raw data corresponding to signals received from the one or more sensors in sensor arrangement 56, and/or other data derived from the signals received from the one or more sensors in sensor arrangement 56. Storage device 88 may embody non-transitory computer-readable media, for example, Random Access Memory (RAM) devices, NOR or NAND flash memory devices, Read Only Memory (ROM) devices, CD-ROMs, hard disks, floppy drives, optical media, solid state storage media, etc. Although FIG. 2 illustrates controller 58 as having one storage device 88, it is contemplated that controller 58 may embody any number of storage devices 88.

Controller 58 may be configured to receive signals from temperature sensors 64, 66, pressure sensor 68, speed sensor 70, load sensor 72, flow sensors 74, 76, crank-angle sensor 78, emissions sensor 80, and/or any other sensors associated with engine 10. Controller 58 may be configured to determine one or more engine parameters based on the signals received from the sensors in sensor arrangement 56. For example, controller 58 may be configured to determine an air-fuel ratio based on the signals received from flow sensors 74, 76 corresponding to an air flow rate and a fuel flow rate respectively. As another example, controller 58 may be configured to determine a torque or power output of engine 10 based on signals received from pressure sensor 68, speed sensor 70, and crank-angle sensor 78. Controller 58 may also be configured to determine other engine parameters such as an amount of load, IMEP, fuel efficiency, an amount of $NO_x$ in the exhaust, etc. based on the signals received from the sensors in sensor arrangement 56 and/or other sensors associated with engine 10.

Controller 58 may be configured to determine a number of droplets 46 of the ignition promoter material, droplet sizes of droplets 46, amounts of charge to be applied to droplets 46, and a timing of and duration for discharge of droplets 46, based on the signals received from the various sensors. Controller 58 may be also configured to control droplet generator 60 of droplet injector 40 to adjust the number of droplets 46 and droplet sizes of droplets 46 generated by droplet injector 40. Similarly, controller 58 may be configured to control charge generator 62 of droplet injector 40 to adjust the amounts of charge applied to droplets 46 by charge generator 62. Controller 58 may be further configured to determine a first crank-angle $\theta_1$ at which droplet injector 40 may begin injecting droplets 46 into intake manifold 28 and/or combustion chamber 20. Controller 58 may also be configured to determine a second crank-angle $\theta_2$ at which droplet injector 40 may stop injecting droplets 46 into intake manifold 28 and/or combustion chamber 20. First crank-angle $\theta_1$ may represent a timing of droplet injection and the difference between second crank-angle $\theta_2$ and first crank-angle $\theta_1$ may represent a duration of droplet injection. Thus, controller 58 may control the number of droplets 46, droplet sizes of droplets 46, amounts of charge on droplets 46, timing of droplet injection, and duration of droplet injection by controlling the operation of droplet injector 40.

INDUSTRIAL APPLICABILITY

The engine system of the present disclosure has wide applications in a variety of engine types including, for example, dual-fuel diesel engines and gasoline engines, and/or gaseous-fuel-powered engines. The disclosed engine system may be implemented into any engine wherein it may be advantageous to control a number and droplet size of droplets of an ignition promoter material delivered to a combustion chamber of the engine. The disclosed engine system may also be implemented into any engine wherein it may be advantageous to control a distribution of the droplets of the ignition promoter material within the combustion chamber by controlling the amounts of electrical charge applied to the droplets. In addition, the disclosed engine system may be implemented into any engine wherein it may be advantageous to control a timing and duration of droplet injection. An exemplary method of operation of engine system 54 will be discussed next.

Figure 3:
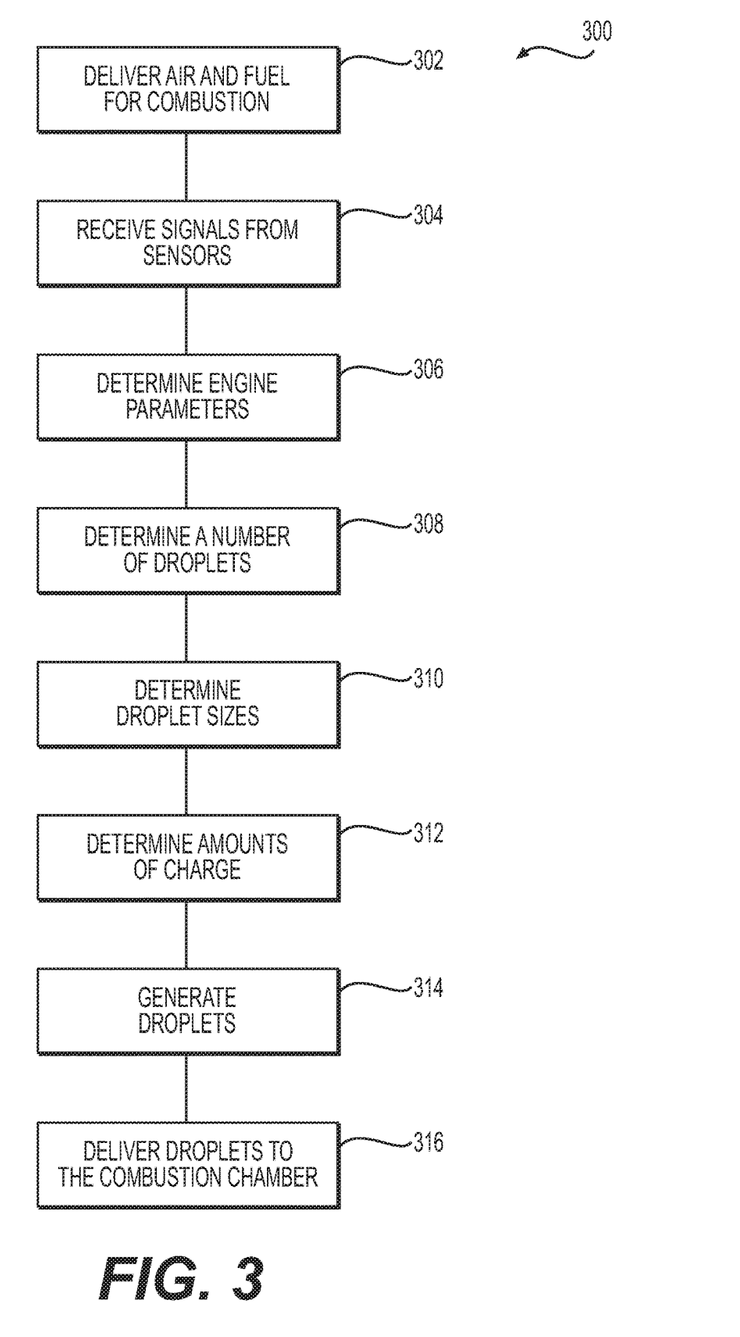
FIG. 3 is a flow chart illustrating an exemplary disclosed method performed by the engine system of FIG. 2.

FIG. 3 illustrates an exemplary method 300 of delivering droplets 46 to combustion chamber 20 using engine system 54. Method 300 may include a step of delivering air and fuel for combustion (step 302) to combustion chamber 20. For example, as piston 16 moves from TDC to BDC, controller 58 may direct one or more intake valves 30 associated with cylinder 14 to open one or more intake ports 32, allowing intake air from intake manifold 28 to flow into combustion chamber 20. Controller 58 may also control one or more pumps or valves associated with first source 34 to allow fuel to flow from first source 34 to combustion chamber 20 via passageway 36. It is contemplated that controller 58 may deliver air and fuel to combustion chamber 20 sequentially in any order, or simultaneously.

Method 300 may include a step of receiving signals from one or more sensors associated with engine 10 (Step 304). For example, controller 58 may receive signals from one or more of temperature sensors 64, 66, pressure sensor 68, speed sensor 70, load sensor 72, flow sensors 74, 76, crank-angle sensor 78, emissions sensor 80, and/or any other sensors associated with engine 10. Although step 304 has been illustrated as being subsequent to step 302 in FIG. 3, it is contemplated that controller 58 may receive signals from the one or more sensors associated with engine 10 before, during, or after execution of step 302. It is also contemplated that in some exemplary embodiments, controller 58 may receive signals from the one or more sensors associated with engine 10 periodically, for example, after a predetermined time interval. It is further contemplated that controller 58 may receive signals from fewer than all of the sensors associated with engine 10. In some exemplary embodiments, controller 58 may receive signals from the sensors at different times during the movement of piston 16 from TDC to BDC and vice-versa within cylinder 14. Controller 58 may store data associated with the signals received from the sensors associated with engine 10 in storage device 88. In one exemplary embodiment, data associated with the signals may include values representing one or more engine parameters, voltages, signal amplitudes, and/or frequencies.

Method 300 may include a step of determining one or more engine parameters (step 306) based on the signals received from the one or more of temperature sensors 64, 66, pressure sensor 68, speed sensor 70, load sensor 72, flow sensors 74, 76, crank-angle sensor 78, emissions sensor 80, and/or any other sensors associated with engine 10. Controller 58 may also perform one or more operations on the signals received from the sensors associated with engine 10. For example, controller 58 may perform a variety of mathematical operations to determine data such as, averages, moving averages, maximum and minimum values, ratios, products, etc. of the data associated with the signals over a predetermined period of time. In one exemplary embodiment, the predetermined period of time may be the time it takes for piston 16 to move from TDC to BDC and/or from BDC to TDC within cylinder 14.

Controller may determine engine parameters such as intake air temperature, combustion chamber temperature, IMEP, air flow rate, fuel flow rate, engine speed, etc., based on the signals received from the sensors associated with engine 10. Controller 58 may also combine signals from the one or more sensors to determine engine parameters, such as, IMEP, torque output of engine 10, power output of engine 10, air-fuel ratio in combustion chamber 20, an amount of soot, an amount of $NO_x$, or amounts of other gases in the exhaust generated in combustion chamber 20. Controller 58 may determine the various engine parameters by using calibration equations or tables, by executing instructions representative of physical models of the operations of engine 10, by using empirically derived relationships between various engine parameters, or by using lookup tables stored in storage device 88.

Method 300 may include a step of determining a number of droplets 46 of an ignition promoter material (step 308) for injection into combustion chamber 20 based on the engine parameters determined in, for example, step 306. Controller 58 may determine the number of droplets 46 required for a combustion cycle in many ways. In one exemplary embodiment, controller 58 may execute instructions embodying one or more algorithms that determine an amount of ignition promoter required to ensure combustion of a threshold amount of the air-fuel-mixture in combustion chamber 20. The threshold amount may, for example, range between about 80% to about 90% of a total amount of air-fuel-mixture in combustion chamber 20. As used in this disclosure, the terms "about" and "generally" indicate typical tolerances and dimensional rounding. Thus, for example, the terms about and generally may represent percentage variations of ±0.1%, temperature variations of ±0.1° C., etc.

The algorithms employed by controller 58 may include physics based models of the initiation and propagation of one or more flame fronts from one or more locations within combustion chamber 20. Controller may determine the number and positions of discrete locations within combustion chamber 20 that may be required to initiate the flame fronts to ensure that the threshold amount of air-fuel-mixture may be burned in combustion chamber 20. The number of discrete locations may correspond to the number of droplets 46 of the ignition promoter material. In determining the number of droplets 46, controller 58 may also determine an amount of soot that may be generated as result of combustion of the determined number of droplets 46 of the ignition promoter material. Controller 58 may determine the number of droplets 46 required to combust the threshold amount of air-fuel-mixture such that the amount of soot generated because of combustion of the number of droplets 46 remains below a threshold amount of soot.

In another exemplary embodiment, controller 58 may determine the number of droplets based on an air-fuel ratio of the air-fuel-mixture in combustion chamber 20. Controller 58 may use the air flow rate and fuel flow rate determined using the signals from flow sensors 74 and 76, respectively to determine an air-fuel ratio. As the air-fuel ratio in combustion chamber 20 increases, it may become more difficult to initiate and complete combustion of fuel in combustion chamber 20 because of the reduced amount of fuel in the leaner air-fuel-mixture. As the air-fuel ratio increases, therefore, a larger number of droplets 46 of ignition promoter material may be required to initiate a larger number of flame fronts that may help ensure combustion of the threshold amount of air-fuel-mixture in combustion chamber 20. In particular, when more droplets 46 of the ignition promoter material ignite, more heat may be generated, raising the temperature of the air-fuel-mixture in combustion chamber 20 sufficiently to initiate and complete combustion of the threshold amount of air-fuel-mixture in combustion chamber 20. In contrast when the air-fuel-mixture is richer (i.e. the air-fuel ratio decreases), a smaller number of droplets 46 of ignition promoter material may be required to initiate and complete combustion of the threshold amount of air-fuel-mixture in combustion chamber 20. Controller 58 may increase the number of droplets 46 of the ignition promoter material delivered to combustion chamber 20 with increasing air-fuel ratio and decrease the number of droplets with decreasing air-fuel ratio. For example, controller may determine a first number of droplets 46 when the air-fuel ratio has a first value and a second number of droplets 46 larger than the first number when the air-fuel ratio has a second value larger than the first value.

Figure 4:
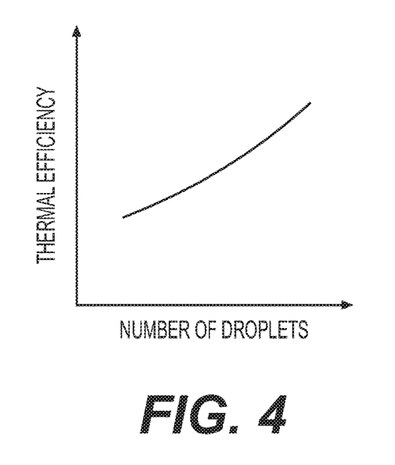
FIG. 4 is a graph showing an exemplary relationship between thermal efficiency of the engine of FIG. 1 with the number of droplets of an ignition promoter material.

In yet another exemplary embodiment, controller 58 may determine the number of droplets 46 of the ignition promoter material based on a desired thermal efficiency. For example, FIG. 4 illustrates an exemplary relationship between thermal efficiency of engine 10 with the number of droplets 46. As illustrated in FIG. 4, thermal efficiency of engine 10 may increase with an increasing number of droplets 46 of the ignition promoter material present in combustion chamber 20. A larger number of droplets 46 in combustion chamber 20 may help initiate more flame fronts within combustion chamber 20, which may help ensure combustion of more of the air-fuel-mixture in combustion chamber 20, resulting in greater thermal efficiency.

Figure 5:
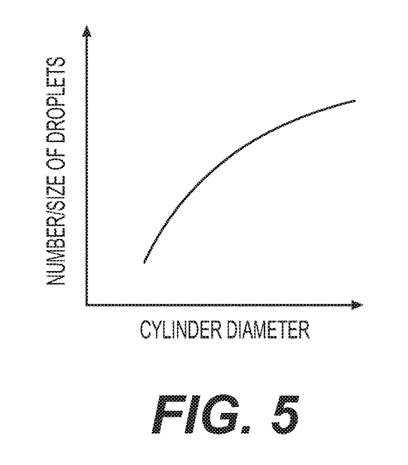
FIG. 5 is a graph showing an exemplary relationship between a diameter of a cylinder of the engine of FIG. 1 and the number of droplets and droplet sizes of the ignition promoter material.

In another exemplary embodiment, controller 58 may at least partially determine the number of droplets 46 based on a diameter of cylinder 14. FIG. 5 illustrates an exemplary relationship between the diameter of cylinder 14 and the number of droplets 46 of ignition promoter material required to burn the threshold amount of air-fuel-mixture in combustion chamber 20. As illustrated in FIG. 5, as the diameter of cylinder 14 increases, a larger number of droplets 46 and/or larger droplet sizes of the ignition promoter material may be required to burn the threshold amount of air-fuel-mixture in combustion chamber 20. A larger diameter of cylinder 14 may correspond to a larger volume of the air-fuel-mixture in combustion chamber 20. A larger number of droplets 46 and/or larger droplet sizes of droplets 46 may help initiate a larger number of flame fronts and may generate more heat, helping to ensure that the threshold amount of air-fuel-mixture may be burned in a larger diameter cylinder 14.

Controller 58 may also determine the number of droplets 46 of the ignition promoter material required for each combustion cycle in combustion chamber 20 based on one or more of the other engine parameters such as, intake air temperature, combustion temperature, IMEP, torque output of engine 10, amount of soot or $NO_x$ in the exhaust, etc. Controller 58 may determine the number of droplets 46 based on executing instructions representing physical models of combustion within combustion chamber 20, empirical relationships between the engine parameters and the number of droplets 46, or by using look-up tables that correlate the number of droplets 46 with the one or more engine parameters.

Returning to FIG. 3, method 300 may include a step of determining droplet sizes of the droplets 46 of the ignition promoter material (Step 310). In one exemplary embodiment, controller 58 may determine that all droplets 46 have a same uniform droplet size. In another exemplary embodiment, controller 58 may determine that droplets 46 have non-uniform droplet sizes. It is also contemplated that controller 58 may determine that a first group of droplets 46 may have a first droplet size and a second group of droplets may have a second droplet size different from the first droplet size. Controller 58 may determine droplet sizes of droplets 46 in many ways. For example, controller 58 may execute instructions embodying an algorithm that determines an amount of ignition promoter material required to ensure combustion of the threshold amount of the air-fuel-mixture in combustion chamber 20. Controller 58 may determine droplet sizes of droplets 46 based on the amount of ignition promoter material required and the number of droplets determined in, for example, step 308.

Figure 6:
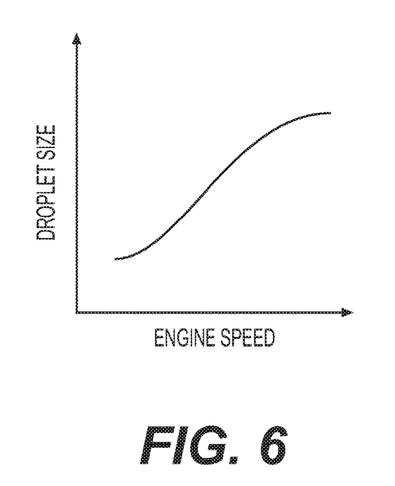
FIG. 6 is a graph showing an exemplary relationship between droplet sizes of droplets of the ignition promoter material and engine speed of the engine of FIG. 1.

In another exemplary embodiment, controller 58 may determine the droplet size based on engine speed. FIG. 6 illustrates an exemplary relationship between engine speed of engine 10 and the droplet size of a droplet 46. As illustrated in FIG. 6, as the engine speed increases droplet size of the droplet 46 also increases. For example, controller may determine a first droplet size for droplets 46 when the engine speed has a first value and a second droplet size for droplets 46 larger than the first droplet size when the engine speed has a second value larger than the first value. As the engine speed increases, a larger amount of air may flow at a higher velocity through the same cross section of intake manifold 28. The larger velocity may cause some of the droplets 46 to break down into smaller sized droplets 46. Thus, as the engine speed increases, controller 58 may determine that droplet generator 40 should generate droplets 46 having a larger droplet size to compensate for the potential break up of at least some of the droplets 46 into smaller sized droplets 46.

Controller 58 may also increase the droplet size as the air-fuel ratio becomes increasingly leaner. For example, controller 58 may determine a first droplet size for droplets 46 when the air-fuel ratio has a first value and a second droplet size larger than the first droplet size when the air-fuel ratio has a second value larger than the first value. A larger droplet size of droplets 46 may help ensure that more heat is released as droplets 46 burn within combustion chamber 20. The larger amount of heat generated, when the larger sized droplets burn, may help sufficiently raise the temperature of the lean air-fuel-mixture in combustion chamber 20 to ensure combustion of the threshold amount of the air-fuel-mixture. In contrast, when the air-fuel-mixture is relatively richer (i.e. there is more fuel), the amount of heat required to initiate combustion of the air-fuel-mixture may be smaller, requiring smaller droplet sizes of droplets 46 of the ignition promoter material.

In another exemplary embodiment, controller 58 may determine the droplet sizes of droplets 46 of the ignition promoter material based on an amount of $NO_x$ in the exhaust exiting from combustion chamber 20. Controller 58 may increase droplet sizes of droplets 46 as the amount of $NO_x$ in the exhaust increases. For example, controller 58 may determine a first droplet size for droplets 46 when the amount of $NO_x$ in the exhaust has a first value and a second droplet size larger than the first droplet size when the amount of $NO_x$ in the exhaust has a second value larger than the first value. Increasing the droplet sizes of droplets 46 may help ensure that more of the air-fuel-mixture in combustion chamber 20 is combusted to reduce or eliminate the production of $NO_x$ in combustion chamber 20.

In yet another exemplary embodiment, controller 58 may vary the droplet sizes of droplets 46 of the ignition promoter material generated by droplet generator 60 based on the crank-angle θ. As piston 16 moves from TDC to BDC, controller 58 may initially adjust droplet generator 60 to generate droplets 46 having a larger droplet size and decrease the droplet size of droplets 46 with increasing crank-angle θ. For example, controller 58 may determine a first droplet size for droplets 46 at a first crank-angle and a second droplet size smaller than the first droplet size at a second crank-angle larger than the first crank-angle. By varying the droplet size in this manner, controller 58 may help ensure more uniform distribution of droplets 46 between cylinder head 18 and a position of piston 16 in cylinder 14.

A larger sized droplet 46 may have a larger momentum because of its larger droplet size as compared to a smaller sized droplet 46. Because of the larger momentum, the larger sized droplet 46 may travel further into combustion chamber 20 in a direction from cylinder head 18 towards crankshaft 22 as piston 16 moves from TDC to BDC. By initially generating larger sized droplets 46, the initially generated droplets 46 may be able to travel a larger distance from cylinder head 18 towards the piston 16 as compared to the later generated smaller sized droplets 46. Thus, by generating droplets 46 of different sizes, controller 58 may help ensure that droplets 46 may be distributed in combustion chamber 20 between cylinder head 18 and piston 16. Combustion of droplets 46 uniformly distributed in different portions of combustion chamber 20 may help generate flame fronts propagating within combustion chamber 20 from multiple locations, which in turn may help ensure combustion of the threshold amount of air-fuel-mixture in combustion chamber 20.

Controller 58 may also determine the droplet sizes of droplets 46 of ignition promoter material based on one or more of the other engine parameters such as, intake air temperature, combustion temperature, IMEP, torque output of engine 10, amount of soot or NOx in the exhaust, etc. Controller 58 may determine the droplet sizes of droplets 46 based on executing instructions representing physical models of combustion within combustion chamber 20, empirical relationships between the engine parameters and the droplet sizes of droplets 46, or using look-up tables that correlate the droplet sizes of droplets 46 with the one or more engine parameters.

Returning to FIG. 3, method 300 may include a step of determining an amount of charge (step 312) to be applied to droplets 46 of the ignition promoter material. Droplets 46 may be charged so that adjacent droplets repel each other, preventing coalescence of adjacent droplets. Charging droplets 46 may also help to distribute droplets 46 within combustion chamber 20. For example, charge generator 62 may charge droplets 46 with the same polarity as that of cylinder 14, piston 16, and cylinder head 18. This may help ensure that cylinder 14, piston 16, and cylinder head 18 may also repel droplets 46 to prevent sticking of the ignition promoter material to surfaces of cylinder 14, piston 16, and cylinder head 18. The amount of charge applied to each droplet 46 may be uniform or non-uniform.

Because the distance between adjacent droplets 46 depends on the amount of charge applied to droplets 46, applying the same amount of charge to droplets 46 may cause the droplets in combustion chamber 20 to be about equally spaced. However, to ensure adequate mixing of droplets 46 and fuel with air in combustion chamber 20, it may be desirable to have droplets 46 spaced at different distances relative to each other. Controller 58 may achieve this by applying different amounts of charge to different droplets 46. Controller 58 may determine a droplet charge variation of droplets 46 based on a variety of engine parameters. As used in this disclosure, droplet charge variation may represent the differences in the amounts of charge applied to different droplets 46. In one exemplary embodiment, droplet charge variation may be a difference between a maximum amount of charge and a minimum amount of charge applied to droplets 46. In other exemplary embodiments, droplet charge variation may be represented by statistical data, for example, standard deviation, variance, etc. of the amounts of charge applied to droplets 46. It is contemplated that other mathematical representations known in the art may be used to quantify the droplet charge variation.

Figure 7:
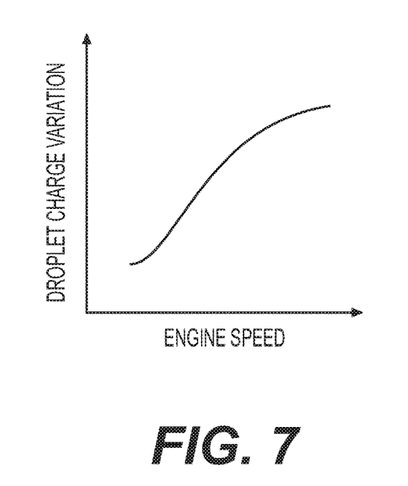
FIG. 7 is a graph showing an relationship between charge variation on the droplets of the ignition promoter material and engine speed of the engine of FIG. 1.

FIG. 7 illustrates an exemplary relationship between engine speed and droplet charge variation. As illustrated in FIG. 7, a higher droplet charge variation may be required at higher engine speeds. Controller 58 may control charge generator 62 to apply different amounts of charge to droplets 46 so that droplets 46 may have a first droplet charge variation at a first engine speed and a second droplet charge variation greater than the first droplet charge variation at a second engine speed greater than the first engine speed. Higher engine speeds may be accompanied by a larger volume of air intake into combustion chamber 20. A higher droplet charge variation at higher engine speeds may help ensure that droplets 46 are spaced apart at different distances from each other, which in turn may promote mixing and a more uniform distribution of droplets 46 in combustion chamber 20. A more uniform distribution of droplets 46 may help ensure that the threshold amount of air-fuel-mixture may be burned in combustion chamber 20 during each combustion cycle.

Figure 8:
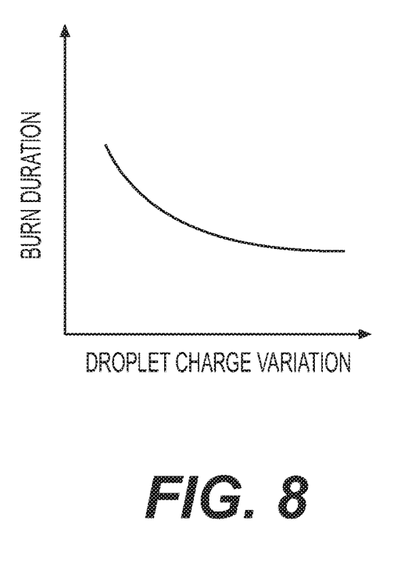
FIG. 8 is a graph showing an relationship between burn duration and the charge variation on the droplets of the ignition promoter material.

FIG. 8 illustrates an exemplary relationship between burn duration and the droplet charge variation for droplets 46. As used in this disclosure, burn duration refers to an amount of time required to burn a predetermined amount of air-fuel-mixture in combustion chamber 20. In one exemplary embodiment, the predetermined amount may be about 10%. Thus, burn duration represents the speed with which fuel is burned in combustion chamber 20. As illustrated in FIG. 8, burn duration decreases as droplet charge variation increases. A decrees in burn duration may represent a faster burning of fuel. This is because as explained above, increasing the droplet charge variation helps increase the variation in the relative spacing of droplets 46, which in turn promotes mixing and distribution of droplets 46 within combustion chamber 20. A more uniform distribution of droplets 46 and improved mixing in combustion chamber 20 may help more of the air-fuel-mixture in combustion chamber 20 to burn in a shorter period of time. Thus, controller 58 may control charge generator 62 to help ensure that a first droplet charge variation in droplets 46 at a first speed is greater than a second droplet charge variation in droplets 46 at a second speed when the first speed is higher than the second speed.

Controller 58 may determine the amount of charge to be applied to each droplet 46 in many ways. For example, controller 58 may determine a desired position of each droplet 46 in combustion chamber 20 to promote combustion of the air-fuel-mixture in combustion chamber 20. Controller 58 may determine the desired position based on physics based models of the initiation and propagation of flame fronts within combustion chamber 20. In some exemplary embodiments, controller 58 may determine the desired location of droplets 46 based on empirical correlations or look-up tables that relate various engine parameters to the desired location of droplets 46. Controller 58 may determine the amount of charge that may be required to ensure that the droplets 46 are repelled from each other and from cylinder 14, piston 16, and cylinder head 18 to reach the desired locations of droplets 46 within combustion chamber 20.

In one exemplary embodiment, controller 58 may control charge generator 62 of droplet generator 40 to apply an increasing amount of charge with increasing droplet size. For example, controller 58 may determine a first amount of charge to be applied to a first droplet 46 having a first droplet size and a second amount of charge larger than the first amount of charge to be applied to a second droplet 46 having a second droplet size greater than the first droplet size. As discussed earlier, droplets 46 having a larger droplet size will likely have a larger momentum, making it more likely that these larger sized droplets 46 may travel further within combustion chamber 20. The larger first amount of charge on these larger sized droplets 46 may help ensure that these droplets 46 do not collide with cylinder 14 and/or piston 16 as piston 16 moves within cylinder 14.

In another exemplary embodiment, controller 58 may apply a larger amount of charge on droplets 46 as the engine speed increases. For example, controller 58 may determine a first amount of charge to be applied to droplets 46 when engine 10 operates at a first engine speed and a second amount of charge to be applied to droplets 46 when engine 10 operates at a second engine speed. The first amount of charge may be larger than the second amount of charge when the first engine speed exceeds the second engine speed. At higher engine speeds, droplets 46 may have a larger momentum and may travel further into combustion chamber 20 compared to at smaller engine speeds. Thus, at higher engine speeds, it is more likely that droplets 46 may collide with cylinder 14, piston 16, and cylinder head 18. Therefore, controller 58 may control charge generator 62 to apply a larger amount of charge to droplets 46 at higher engine speeds as compared to a lower engine speeds to help prevent droplets 46 from colliding with and sticking to cylinder 14, piston 16, and cylinder head 18.

In yet another exemplary embodiment, controller 58 may determine that a larger amount of charge must be applied on droplets 46 as the air-fuel ratio increases. For example, controller 58 may determine a first amount of charge to be applied to droplets 46 when engine 10 operates at an air-fuel ratio having a first value and a second amount of charge to be applied to droplets 46 when engine 10 operates at an air-fuel ratio having a second value greater than the first value. As the air-fuel ratio increases, the air-fuel-mixture in the combustion chamber becomes leaner. Applying a larger amount of charge to droplets 46 when the air-fuel-mixture is leaner may help improve the distribution of droplets 46 of the ignition promoter material in combustion chamber 20. In particular, the larger amount of charge may cause droplets 46 to repel each other so that the distance between droplets 46 increases making it possible for droplets 46 to be distributed at larger distances from cylinder head 18 and from the walls of cylinder 14. Separating the droplets 46 from each other and from the walls of combustion chamber 20 by larger distances may allow initiation of flame fronts at many different locations within combustion chamber 20, helping to ensure improved combustion of the air-fuel mixture within combustion chamber 20.

Controller 58 may also determine the amount of charge for droplets 46 of ignition promoter material based on one or more of the other engine parameters such as, intake air temperature, combustion temperature, IMEP, torque output of engine 10, amount of soot or NOx in the exhaust, etc. Controller 58 may determine the amount of charge for each droplet 46 based on executing instructions representing physical models of combustion within combustion chamber 20, empirical relationships between the engine parameters and the amount of charge, or using look-up tables that correlate the amounts of charge with the one or more engine parameters.

Returning to FIG. 3, method 300 may include a step of generating droplets 46 (Step 314). Controller 58 may control droplet generator 60 to generate the number of droplets 46 determined, for example, in step 308. Controller 58 may also control droplet generator 60 to generate droplets 46 having the droplet sizes of droplets 46 as determined, for example, in step 310. In addition, controller 58 may control charge generator 62 to apply the amount of charge on each droplet 46 as determined, for example, in step 312. Thus, controller 58 may control droplet injector 40 to generate the desired number of droplets 46, having the desired droplet sizes and the desired amounts of charge as determined by controller 58 based on the engine parameters.

Method 300 may also include a step of delivering the droplets 46 to combustion chamber 20 (Step 316). For example, controller 58 may determine a timing and duration of droplet injection by droplet injector 40 into intake manifold 28 and/or combustion chamber 20. Controller 58 may determine a first crank-angle $\theta_1$ at which controller 58 may direct droplet injector 40 to begin injecting droplets 46 into intake manifold 28 and/or combustion chamber 20. Likewise, controller 58 may determine a second crank-angle $\theta_2$ at which controller 58 may direct droplet injector 40 to stop injecting droplets 46 into intake manifold 28 and/or combustion chamber 20. Thus, controller 58 may control a timing of droplet injection and a duration of droplet injection to help ensure that the threshold amount of air-fuel-mixture may be combusted in combustion chamber 20.

Figure 9:
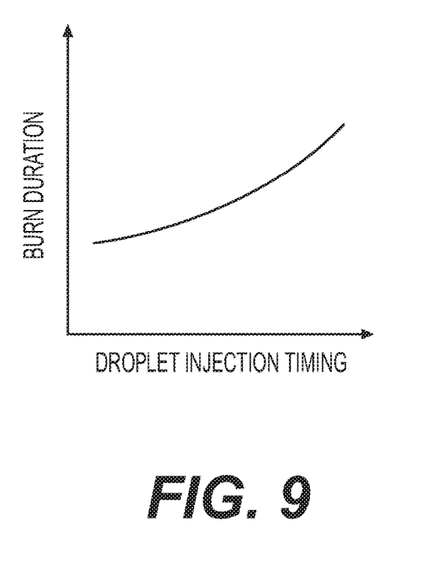
FIG. 9 is a graph showing a relationship between the burn duration and the droplet injection timing.

In one exemplary embodiment, controller 58 may determine the first crank-angle $\theta_1$ to initiate droplet injection based on the desired burn duration. FIG. 9 illustrates an exemplary relationship between the droplet injection timing represented by the first crank-angle $\theta_1$ and the burn duration. As illustrated in FIG. 9, the burn duration increases as the droplet injection timing or the first crank-angle $\theta_1$ increases. In other words, delaying the injection of droplets 46 into combustion chamber 20 by injecting droplets 46 at a higher first crank-angle $\theta_1$ increases the amount of time it takes to burn a predetermined amount of air-fuel-mixture in combustion chamber 20. This may be because delaying injection of droplets 46 may prevent droplets 46 from being adequately distributed within combustion chamber 20, which may increase the burn duration. Returning to FIG. 3, method 300 may end after completion of step 316.

It will be apparent to those skilled in the art that various modifications and variations can be made to the disclosed feedback controlled system without departing from the scope of the disclosure. Other embodiments of the feedback controlled system will be apparent to those skilled in the art from consideration of the specification and practice of the feedback controlled system disclosed herein. It is intended that the specification and examples be considered as exemplary only, with a true scope of the disclosure being indicated by the following claims and their equivalents.

What is claimed is:

1. An engine system, comprising:
   an engine, including at least one cylinder;
   a first source configured to supply fuel for combustion in the engine;
   a second source configured to supply an ignition promoter material for combustion in the engine;
   a droplet injector configured to:
      generate at least one droplet of the ignition promoter material;
      apply an amount of charge on the at least one droplet; and
      deliver the at least one droplet to the at least one cylinder; and
   a controller configured to:
      determine an engine parameter;
      determine the amount of charge based on the engine parameter;
      control the droplet injector to apply the determined amount of charge to the at least one droplet.

2. The engine system of claim 1, wherein the droplet injector includes:
   a droplet generator configured to generate the at least one droplet; and
   a charge generator configured to apply the amount of charge to the at least one droplet.

3. The engine system of claim 1, wherein
   the ignition promoter material includes lubrication oil, and
   the fuel includes natural gas.

4. The engine system of claim 1, wherein the droplet injector is configured to:
   generate a plurality of droplets; and
   apply a same amount of charge to each of the plurality of droplets.

5. The engine system of claim 1, wherein the droplet injector is configured to:
   generate a plurality of droplets; and
   apply different amounts of charge to different droplets selected from the plurality of droplets.

6. The engine system of claim 5, wherein
   the engine parameter is engine speed, and
   the droplet injector is configured:
      apply a first amount of charge to the at least one droplet at a first engine speed; and
      apply a second amount of charge to the at least one droplet at a second engine speed, the second amount of charge being greater than the first amount of charge when the second engine speed is greater than the first engine speed.

7. The engine system of claim 5, wherein
   the engine parameter is air-fuel ratio, and
   the droplet injector is configured to:
      apply a first amount of charge to the at least one droplet when the air-fuel ratio has a first value; and
      apply a second amount of charge to the at least one droplet when the air-fuel ratio has a second value, the second amount of charge being greater than the first amount of charge when the second value is greater than the first value.

8. The engine system of claim 5, wherein
   the plurality of droplets include:
      a first droplet having a first droplet size; and
      a second droplet having a second droplet size greater than the first droplet size, and
   the droplet injector is configured to:
      apply a first amount of charge to the first droplet; and
      apply a second amount of charge greater than the first amount of charge to the second droplet.

9. The engine system of claim 5, wherein the droplet injector is configured to apply the different amounts of charge such that the droplets have
   a first droplet charge variation at a first engine speed, and
   a second droplet charge variation greater than the first droplet charge variation at a second engine speed greater than the first engine speed.

10. An engine, comprising:
    a plurality of cylinders;
    an intake manifold configured to deliver air for combustion to the cylinders;
    an exhaust manifold configured to discharge exhaust from the cylinders;
    a first source configured to supply fuel for combustion in the cylinders;
    a second source configured to supply an ignition promoter material;
    a droplet generator configured to receive the ignition promoter material from the second source and generate at least one droplet of the ignition promoter material;
    a charge generator configured to apply an amount of charge to the at least one droplet; and a controller configured to:
  determine an engine parameter;
  determine the amount of charge based on the engine parameter; and
  adjust the charge generator to apply the determined amount of charge on the at least one droplet.

11. The engine of claim 10, wherein
the droplet generator is configured to generate a plurality of droplets, and
the charge generator is configured to apply different amounts of charge to different droplets selected from the plurality of droplets.

12. The engine of claim 11, wherein
the engine parameter is engine speed, and
the charge generator is configured to:
  apply a first amount of charge to the at least one droplet at a first engine speed; and
  apply a second amount of charge to the at least one droplet at a second engine speed, the second amount of charge being greater than the first amount of charge when the second engine speed is greater than the first engine speed.

13. The engine of claim 11, wherein
the plurality of droplets includes:
  a first droplet having a first droplet size; and
  a second droplet having a second droplet size greater than the first droplet size, and
the charge generator is configured to:
  apply a first amount of charge to the first droplet; and
  apply a second amount of charge greater than the first amount of charge to the second droplet.

* * * * *